(No Model.) 9 Sheets—Sheet 3.

E. R. FELLOWS.
GEAR SHAPING MACHINE.

No. 579,708. Patented Mar. 30, 1897.

WITNESSES:
A. D. Harrison.
A. D. Adams.

INVENTOR:
E. R. Fellows
by Knight Brown & Quinby
attys.

(No Model.) 9 Sheets—Sheet 4.
E. R. FELLOWS.
GEAR SHAPING MACHINE.
No. 579,708. Patented Mar. 30, 1897.
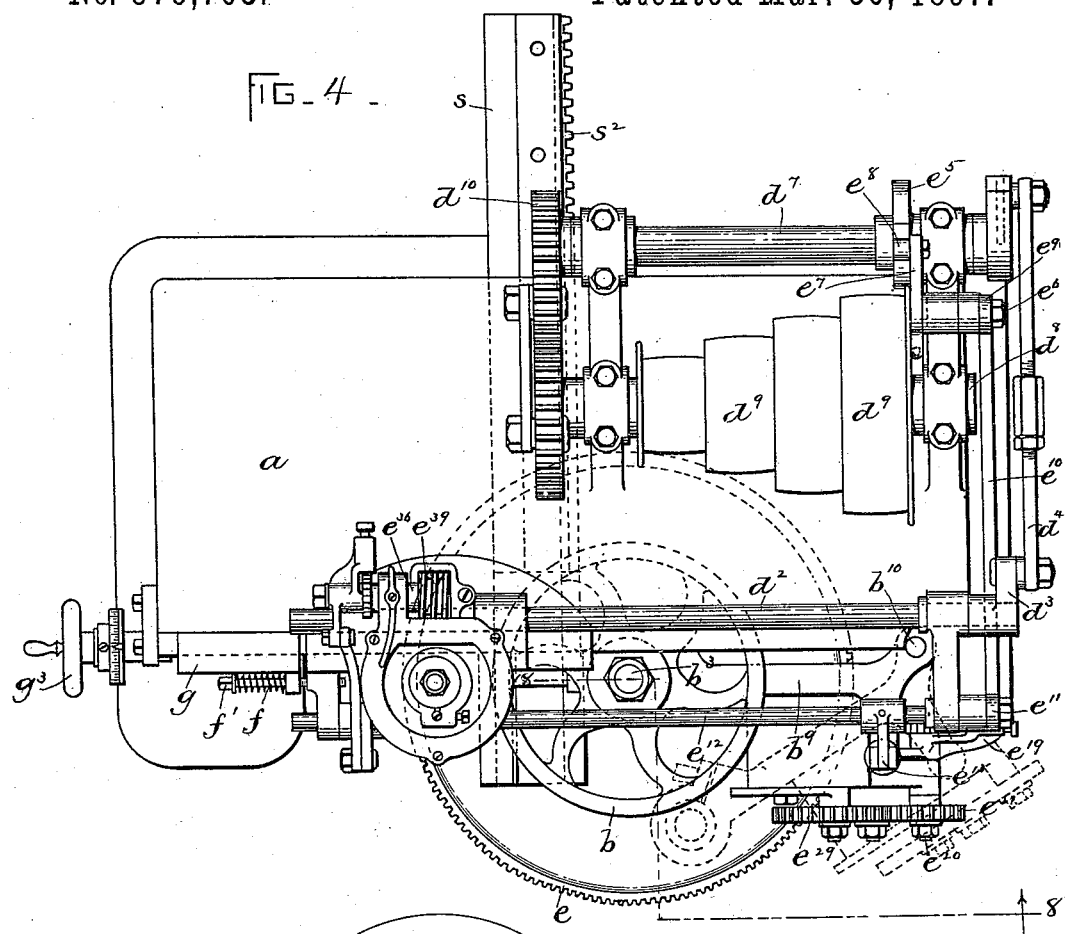
FIG. 4.
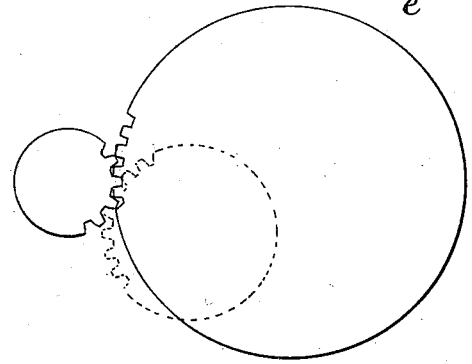
FIG. 4ª.
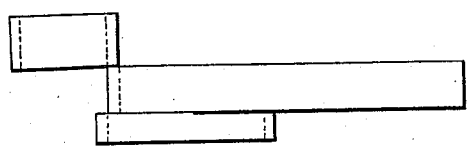
FIG. 4ᵇ.
WITNESSES:
A. D. Harrison.
A. D. Adams.
INVENTOR:
E. R. Fellows
by Wright Brown & Quinby
attys.

(No Model.) 9 Sheets—Sheet 5.
E. R. FELLOWS.
GEAR SHAPING MACHINE.
No. 579,708. Patented Mar. 30, 1897.
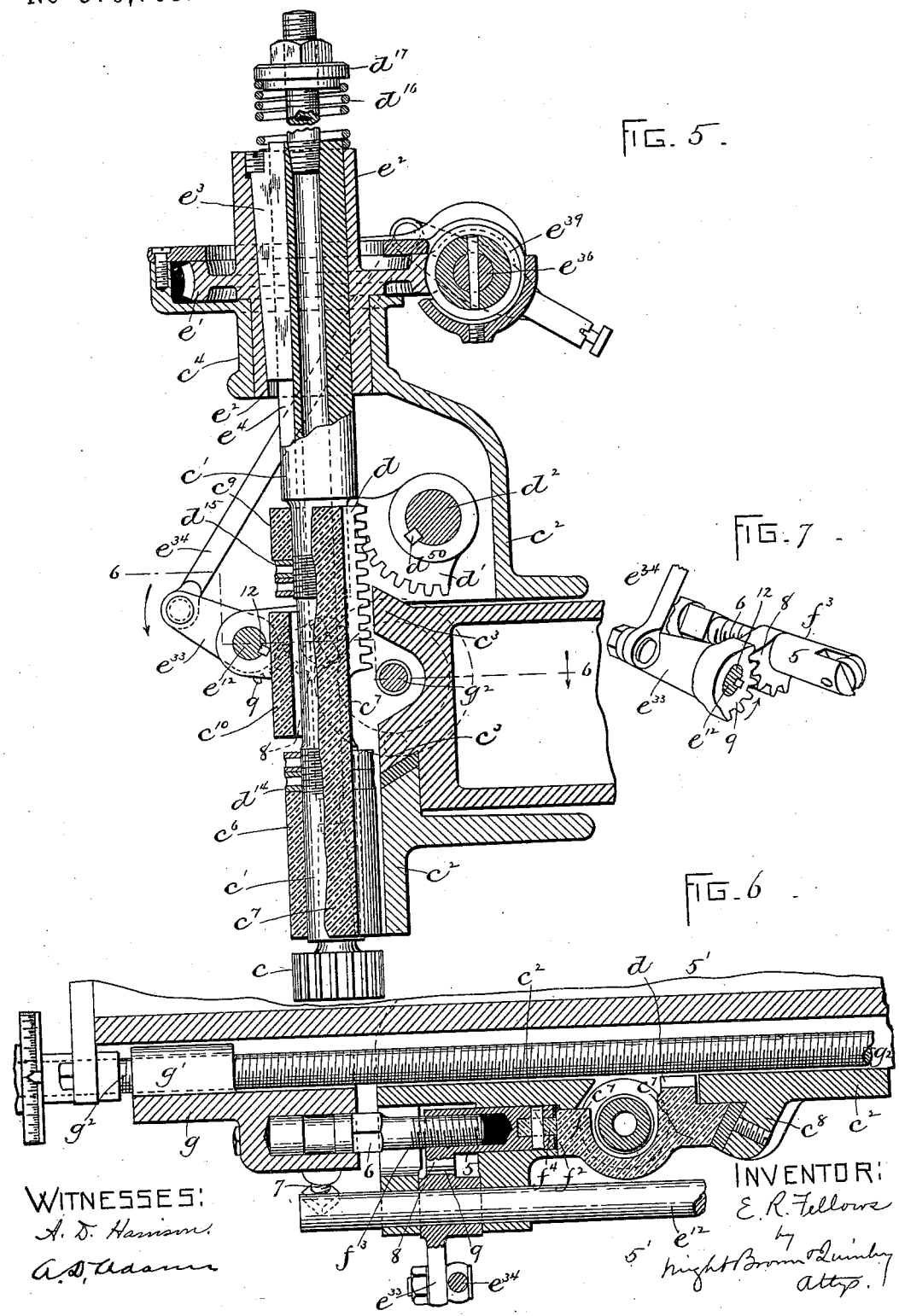
WITNESSES:
A. D. Harrison
A. D. Adams
INVENTOR:
E. R. Fellows
by Wright Brown & Quinby
Attys.
THE NORRIS PETERS CO., PHOTO-LITHO., WASHINGTON, D. C.

(No Model.)  9 Sheets—Sheet 6.
E. R. FELLOWS.
GEAR SHAPING MACHINE.
No. 579,708.  Patented Mar. 30, 1897.
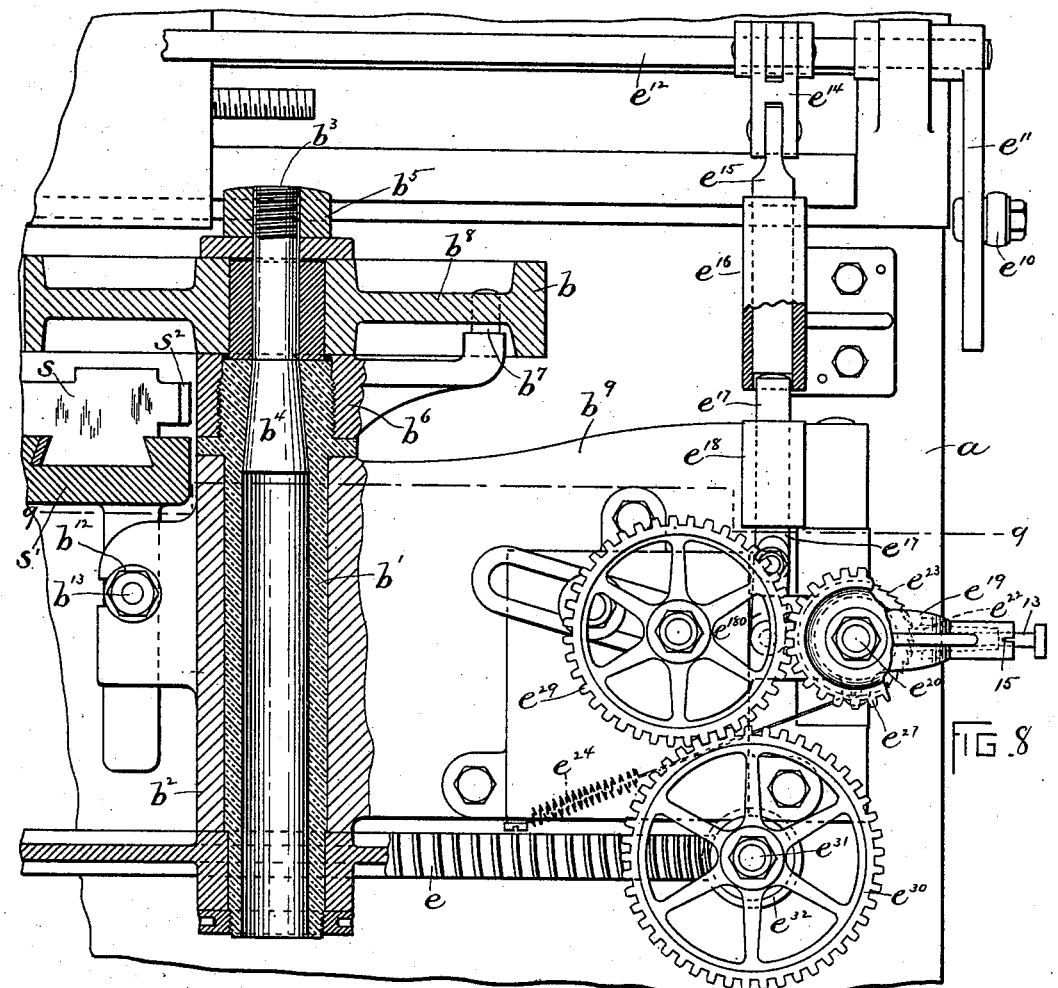
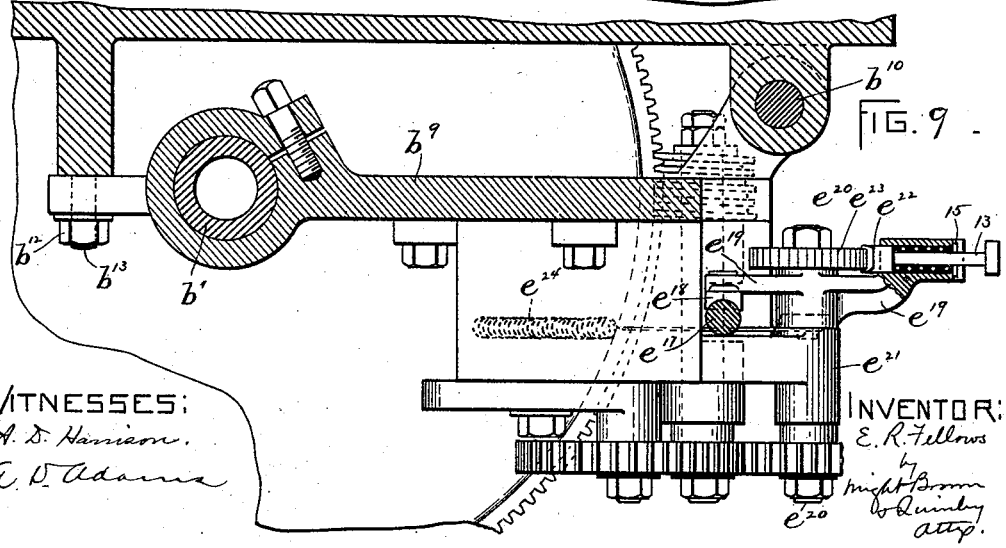
WITNESSES:
A. D. Harrison.
A. D. Adams
INVENTOR:
E. R. Fellows
by Wright Brown & Quinby
attys.
THE NORRIS PETERS CO., PHOTO-LITHO., WASHINGTON, D. C.

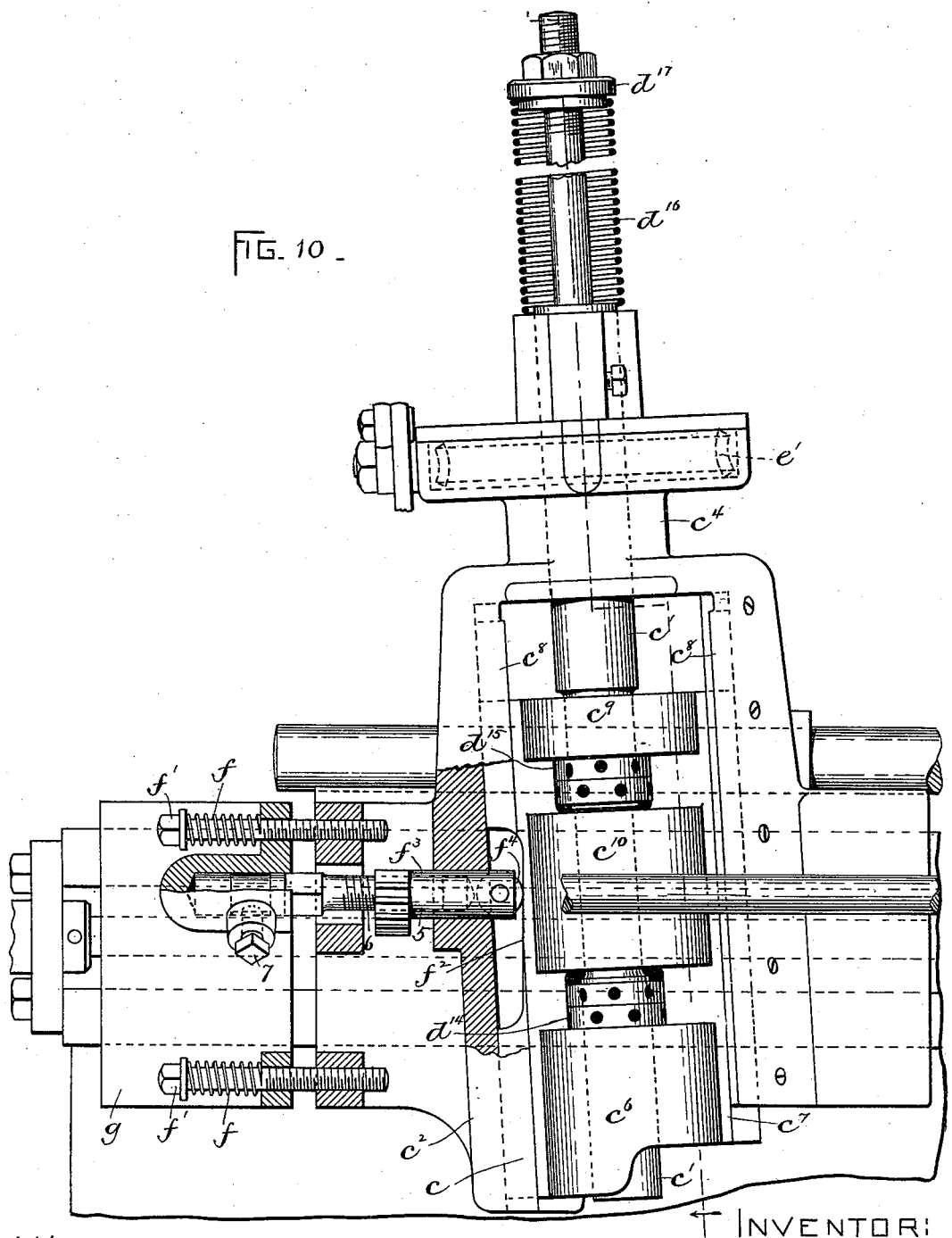

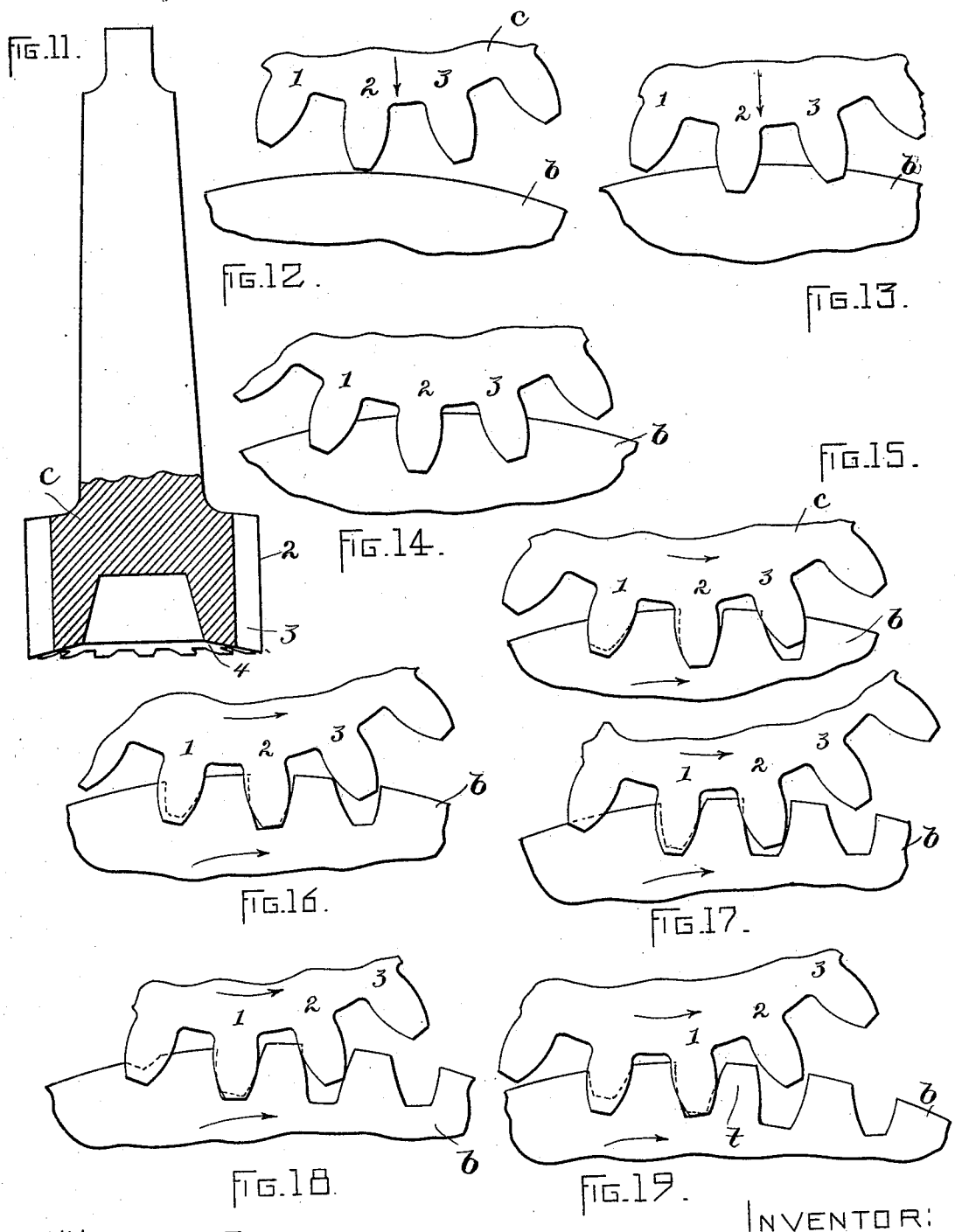
(No Model.) 9 Sheets—Sheet 8.
E. R. FELLOWS.
GEAR SHAPING MACHINE.
No. 579,708. Patented Mar. 30, 1897.

(No Model.)  9 Sheets—Sheet 9.

E. R. FELLOWS.
GEAR SHAPING MACHINE.

No. 579,708.  Patented Mar. 30, 1897.

WITNESSES:
A. O. Harrison
A. S. Adams

INVENTOR.
E. R. Fellows
by Knight Brown Quimby
Attys.

UNITED STATES PATENT OFFICE.

EDWIN R. FELLOWS, OF SPRINGFIELD, VERMONT.

GEAR-SHAPING MACHINE.

SPECIFICATION forming part of Letters Patent No. 579,708, dated March 30, 1897.

Application filed March 31, 1896. Serial No. 585,587. (No model.)

*To all whom it may concern:*

Be it known that I, EDWIN R. FELLOWS, of Springfield, in the county of Windsor and State of Vermont, have invented certain new and useful Improvements in Gear-Shaping Machines, of which the following is a specification.

This invention has for its object to provide a gear-cutting machine adapted to act on a gear or other blank simultaneously at a plurality of points, to the end that the gear-teeth may be cut more rapidly than is possible by the use of a cutter which acts on the blank at but a single point.

The invention also has for its object to enable one cutter to cut teeth for all sizes of gears and to generate the curve for each gear in accordance with the size or diameter thereof.

Figure 1:
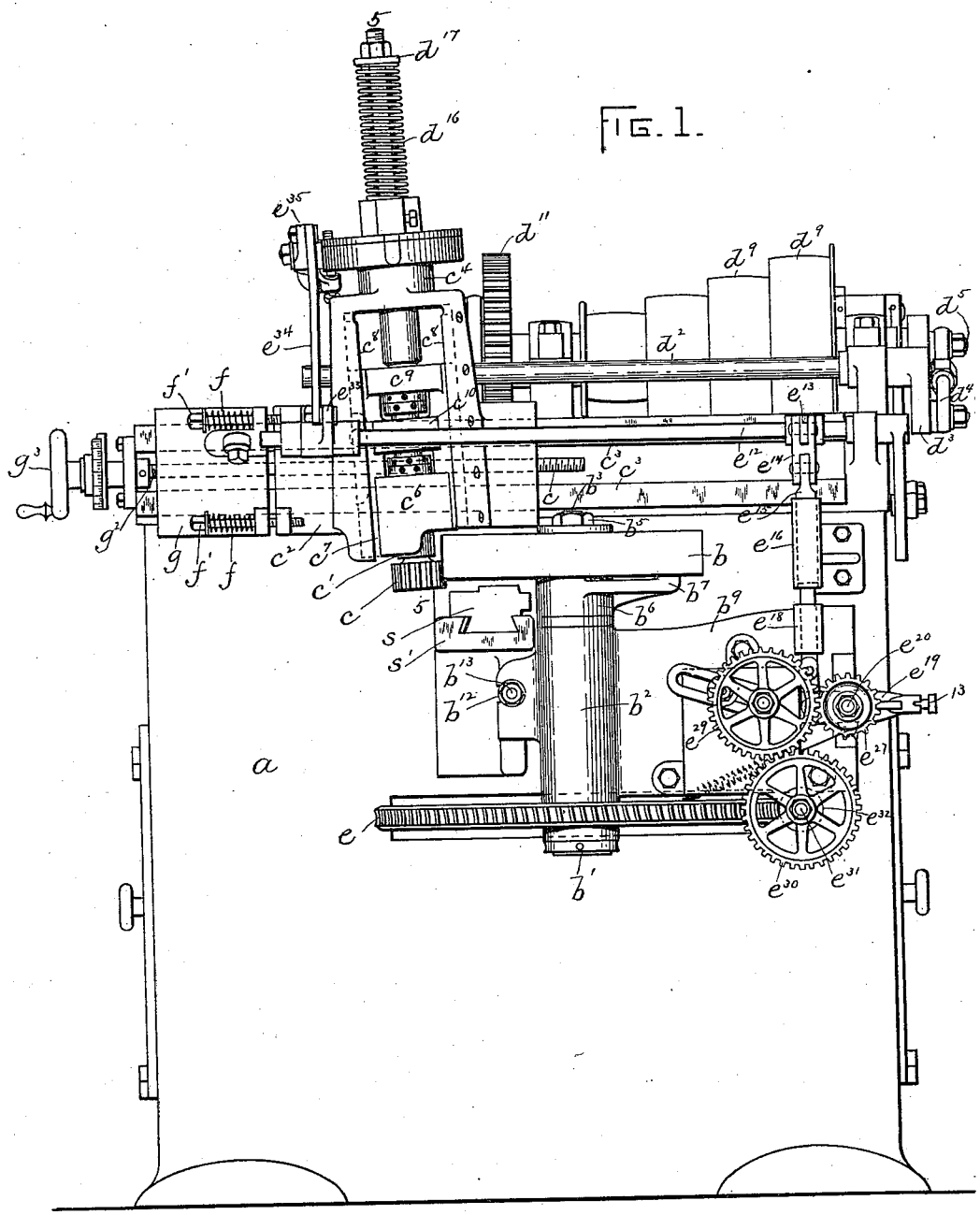
Figure 2:
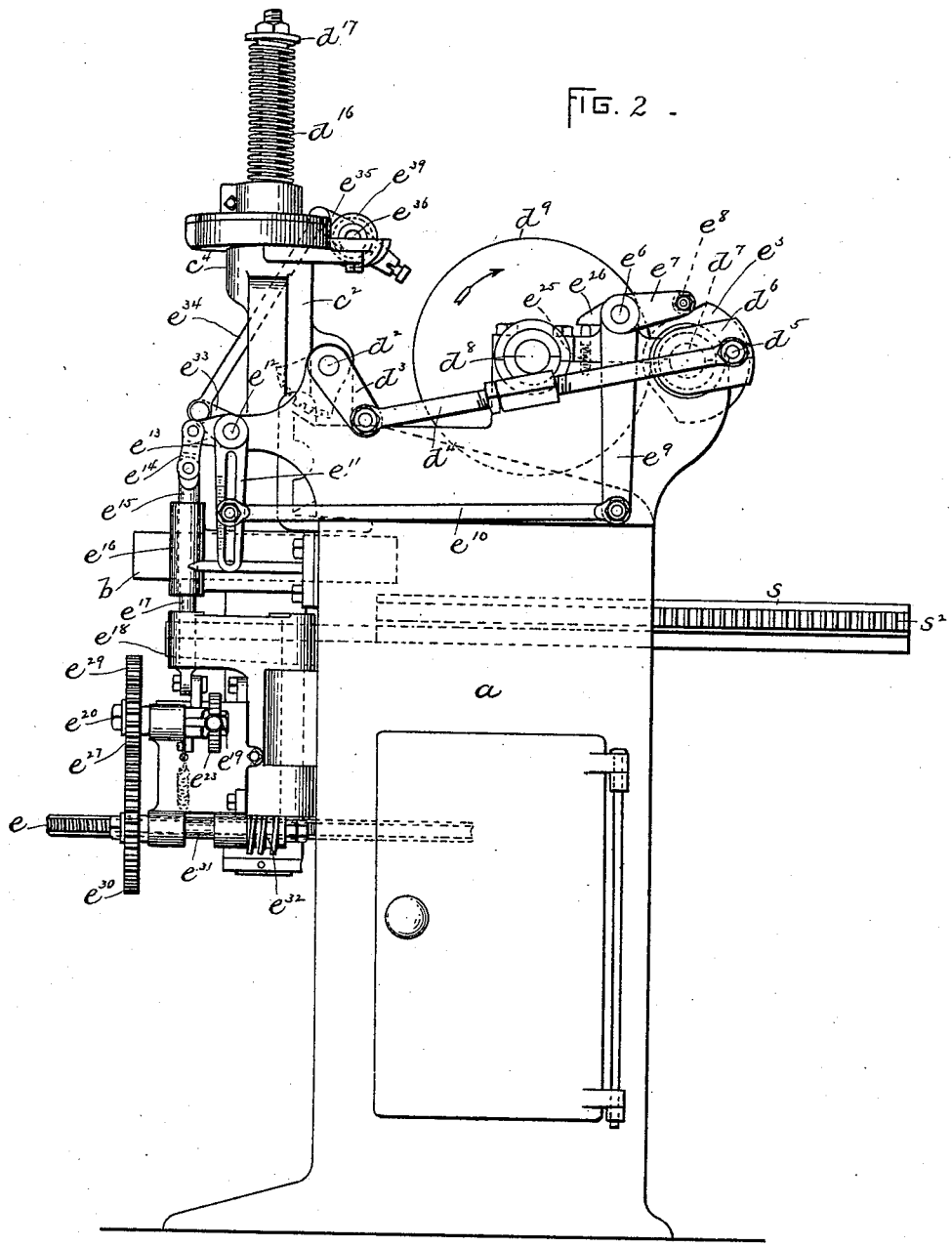
Figure 3:
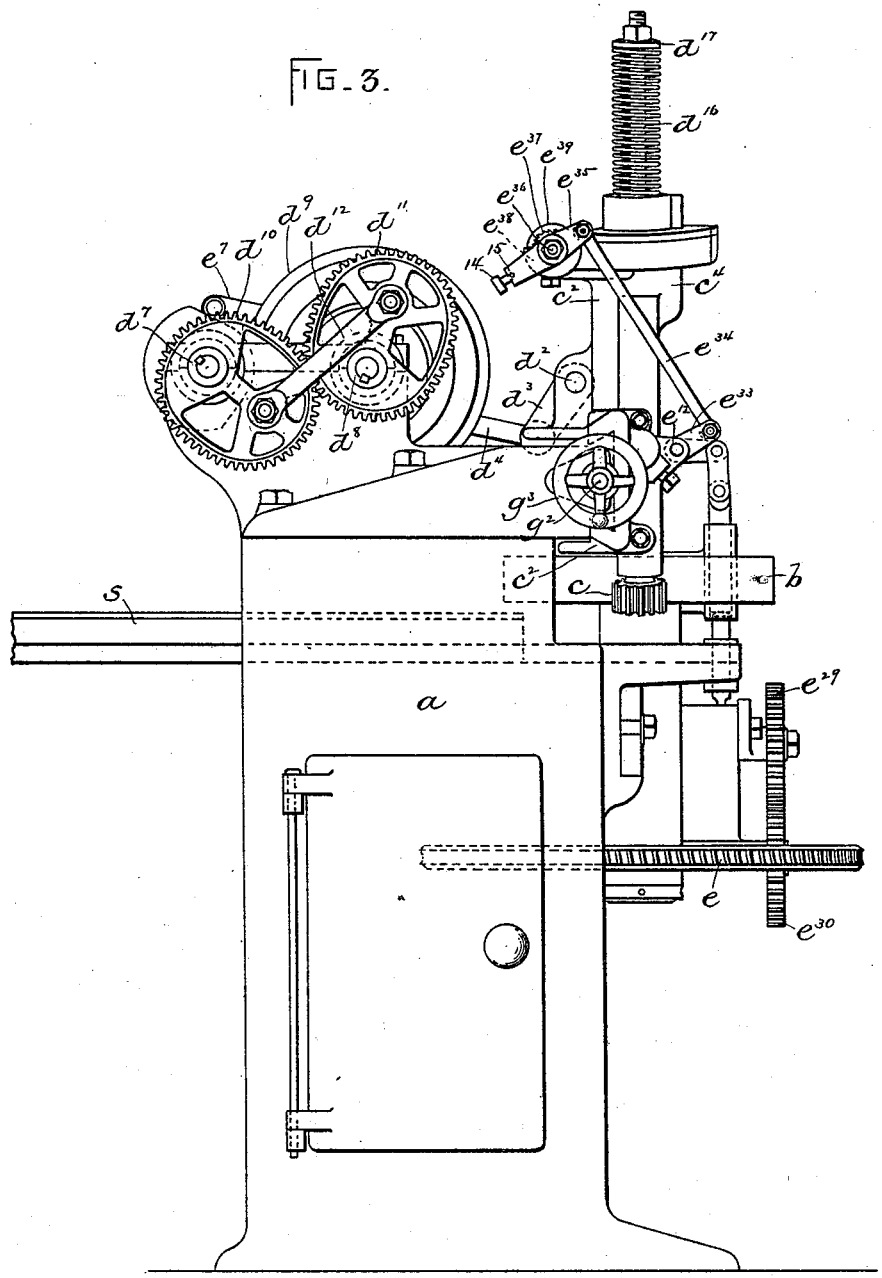
Figure 20:
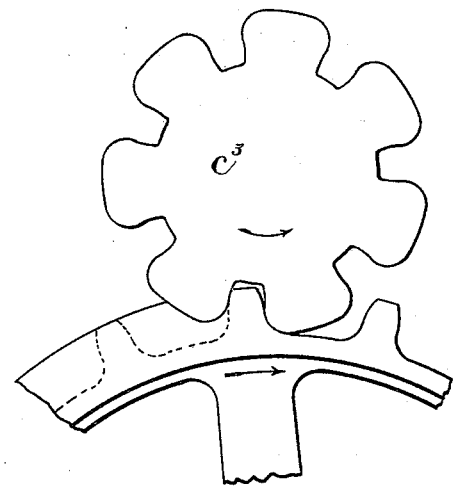
Figure 21:
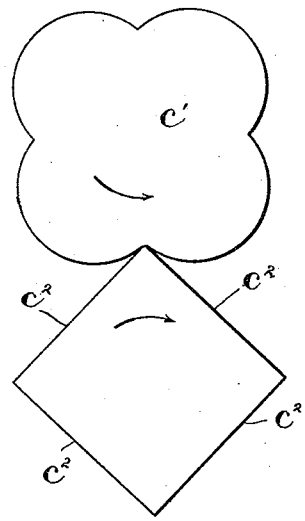

Of the accompanying drawings, forming a part of this specification, Figure 1 represents a front elevation of a gear-cutting machine embodying the best form of my invention at present known to me. Figs. 2 and 3 are end elevations of the same. Fig. 4 represents a plan view. Figs. 4$^a$ and 4$^b$ represent views of accessories hereinafter specified. Fig. 5 represents a section, partly on line 5 5 of Fig. 1, looking toward the right, and partly on the line 5' 5' of Fig. 6. Fig. 6 represents a section on line 6 6 of Fig. 5. Fig. 7 represents a perspective detail view. Fig. 8 represents a section on line 8 8, Fig. 4. Fig. 9 represents a section on line 9 9 of Fig. 8. Fig. 10 represents a front elevation of the cutter-spindle and its carrier. Fig. 11 represents a sectional view of the cutter. Figs. 12 to 19, inclusive, represent plan views of the cutter and blank, showing different stages of the gear-shaping operation. Fig. 20 represents a cutter formed to cut the teeth of a sprocket-wheel. Fig. 21 represents a modified form of cutter and the piece formed thereby.

In the drawings, $a$ represents the supporting-frame, which is provided with means for supporting and progressively moving a blank $b$, on which gear-teeth are to be cut, and $c$ represents the gear-shaped cutter, which is movable in guides on the supporting-frame forward and back across the plane of the blank and is fed or rotated step by step after each backward or return movement, the blank being also given a progressive feed movement after each return movement of the cutter. The result of these movements is the formation of gear-teeth on the blank, as hereinafter described. In forming teeth on circular or gear-wheel blanks the blank is given a step-by-step rotary feed motion, while in forming rack-teeth on straight blanks the blank is given a step-by-step rectilinear feed motion.

I will first describe the machine as constructed for cutting teeth on circular blanks, this being its most important function. The blank $b$ is secured to one end of a spindle $b'$, which is journaled in a bearing $b^2$, supported by the frame of the machine. The spindle is rotated step by step in unison with the cutter by mechanism hereinafter described. As here shown, the blank is engaged with the spindle $b'$ by means of a taper-headed arbor $b^3$, Fig. 8, the head $b^4$ of which is engaged with a tapered seat in the spindle, (the latter being hollow,) a clamping-nut $b^5$ on the arbor holding the blank against a collar $b^6$, secured to the spindle, and a dog $b^7$, formed on the collar $b^6$ and engaged with one of the arms $b^8$ of the blank. The bearing $b^2$ is carried by a swinging arm $b^9$, which is connected by a hinge $b^{10}$ with the supporting-frame, so that the spindle $b'$ may be swung outwardly from its operative position, as shown in dotted lines in Fig. 4, for convenience in applying and removing the work. The arm $b^9$ is secured to hold the spindle $b'$ in its operative position by a nut $b^{12}$, engaged with a bolt $b^{13}$, affixed to the supporting-frame and bearing on a slotted ear on the arm $b^9$.

The cutter $c$ (shown in section in Fig. 11) is a gear-shaped body of hardened steel, having a series of alternating projections 2 and recesses 3, the ends of said projections constituting a series of metal-planing teeth. The outer end 4 of the cutter is preferably slightly recessed or beveled to make the angle formed by its intersection with the outer faces of the teeth slightly acute, thus giving each tooth a suitable rake.

The cutter is given a suitable clearance by inclining its axis relatively to the axis of the blank and at the same time providing for a cutting movement of the cutter in a line parallel with the axis of the blank, as hereinafter described. The cutter is secured to a spindle $c'$, which is journaled to rotate in bearings hereinafter described supported by a primary slide $c^2$, Figs. 1 and 10, said slide being movable on fixed guides $c^3$ $c^3$ toward and from the axis of the blank $b$. The spindle $c'$ rotates in bearing $c^4$, formed on the upper portion of the slide $c^2$, and in a sliding bearing $c^6$, formed on a secondary slide $c^7$, which is movable between guides $c^8$ $c^8$ on the slide $c^2$, the spindle being longitudinally movable in the bearing $c^4$, as hereinafter described.

*Mechanism for moving the spindle endwise in its bearings to give the cutter its forward and return movements across the blank.*—$d$, Figs. 5 and 6, represents a rack which is rigidly secured to or formed on the secondary slide $c^7$ and meshes with a gear-segment $d'$ on a rock-shaft $d^2$, which is journaled in bearings on the supporting-frame, the segment $d'$ having a sliding connection with the shaft $d^2$ by means of a spline $d^{50}$ on the shaft for the purpose hereinafter described. A crank-arm $d^3$, affixed to the rock-shaft $d^2$, is connected by a rod $d^4$ with a wrist-pin $d^5$, Fig. 2, adjustably mounted on a crank-arm $d^6$, affixed to the driving or main shaft $d^7$ of the machine. The rotation of the shaft $d^7$ oscillates the segment $d'$ through the described intermediate mechanism and causes the segment to impart a reciprocating endwise movement to the spindle and cutter.

The main shaft $d^7$ is rotated by a variable-speed driving mechanism which imparts a much more rapid motion to the shaft during the return movement than during the cutting movement of the cutter, so that the cutter moves at a relatively slow rate while cutting and returns to its starting-point at a relatively rapid rate. This result is accomplished in the present embodiment of my invention by means of a shaft $d^8$, which receives motion through a belt running on one of a series of cone-pulleys $d^9$ thereon and intermeshing elliptical gears $d^{10}$ $d^{11}$, affixed, respectively, to the shafts $d^7$ and $d^8$, said gears being connected by a link $d^{12}$. The shaft $d^8$ rotates at a uniform rate of speed, dependent on the size of the pulley with which the driving-belt is engaged, while the shaft $d^7$ receives through the elliptical gears a varying rate of speed. The spindle $c'$ is provided with adjustable nuts or thrust-bearings $d^{14}$ $d^{15}$, one in contact with the bearing $c^6$ and the other in contact with a cross-bar $c^9$, formed on the secondary slide $c^7$ above the bearing $c^6$. The slide is provided between the bearings $c^6$ and cross-bar $c^9$ with an arched brace or cross-bar $c^{10}$, extending across the spindle $c'$ to strengthen the slide.

$d^{16}$ represents a spring which is seated on the upper end of a sleeve $e^2$, hereinafter described, which rotates with the spindle, but does not move endwise with it, the upper end of said spring bearing on a collar $d^{17}$, affixed to the spindle. The spring constantly exerts an upward pressure on the spindle $c'$, its object being to counterbalance the weight of the spindle and the parts that move endwise with it and take up lost motion in the parts connecting the spindle with the wrist-pin $d^5$ on the main shaft.

*Mechanism for progressively rotating or feeding the cutter and blank.*—The blank-spindle $b'$ is provided with a worm-gear $e$, which is affixed to said spindle. The cutter-spindle $c'$ is provided with a worm-gear $e'$, which is formed on or affixed to a sleeve $e^2$, (the latter being fitted to rotate in the bearing $c^4$,) and is provided with a key $e^3$, Fig. 5, engaged with a groove $e^4$ in the cutter-spindle $c'$, provision being thus made for rotatively connecting the gear $e'$ with the cutter-spindle and for permitting said spindle to move endwise independently of the gear.

$e^5$, Fig. 2, represents a cam affixed to the main shaft $d^7$. Motion is communicated from said cam through a system of connections to the worm-gear on the blank and cutter spindles, said connections being as follows: $e^6$ represents a rock-shaft journaled in fixed bearings and provided with an arm $e^7$, having a trundle-roll $e^8$ bearing on the cam $e^5$. To the rock-shaft $e^6$ is affixed a longer arm $e^9$, connected by a rod $e^{10}$ with an arm $e^{11}$, affixed to a rock-shaft $e^{12}$, also journaled in a fixed bearing. The rock-shaft $e^{12}$ has an arm $e^{13}$, which is connected by a link $e^{14}$ with a rod $e^{15}$, sliding in a fixed bearing $e^{16}$. Said rod bears against a rod $e^{17}$, which slides in a bearing $e^{18}$, attached to the arm $b^9$, which is independently movable for reasons hereinbefore explained, the rods $e^{15}$ and $e^{17}$ being in effect sections of one rod. The object of this sectional rod is to permit the detachment of the part or section contained in arm $b^9$ from the part contained in the fixed guide $e^{16}$ on the supporting-frame, thus permitting the swinging of said arm. The rod or section $e^{17}$ is connected by a link $e^{180}$ with one arm of a lever $e^{19}$, which is mounted to oscillate on a shaft $e^{20}$, journaled in a bearing $e^{21}$ on the supporting-frame. The other arm of the lever $e^{19}$ has a spring-pressed pawl $e^{22}$, Fig. 9, which normally engages a ratchet $e^{23}$, affixed to the shaft $e^{20}$. A spring $e^{24}$, attached to the lever $e^{19}$, normally presses upwardly the arm of said lever, to which the link $e^{180}$ is connected, the said pressure being communicated to the arm $e^7$ through the intermediate parts, thus holding said arm against the cam $e^5$ and taking up lost motion in the said intermediate parts. A supplemental pressure is exerted on the arm $e^7$ by a spring $e^{25}$, Fig. 2, acting on a short arm $e^{26}$ on the rock-shaft $e^6$. To the shaft $e^{20}$ is affixed a gear $e^{27}$, which is connected by an intermediate gear $e^{29}$ with a gear $e^{30}$ on a shaft $e^{31}$, having a worm $e^{32}$ meshing with the worm-gear $e$ on the blank-spindle $b'$. The rock-shaft $e^{12}$ has another arm $e^{33}$, which is connected by a link $e^{34}$ with one arm of a lever $e^{35}$, which is mounted to oscillate on a shaft $e^{36}$, journaled in a bearing on the slide $c^2$. The other arm of the lever $e^{35}$ is provided with a spring-pressed pawl $e^{38}$, Fig. 3, which normally engages a ratchet $e^{37}$, affixed to the shaft $e^{36}$. A worm $e^{39}$, affixed to the shaft $e^{36}$, engages the worm-gear $e'$ on the cutter-spindle.

It will be seen that the cam $e^5$ on the main shaft oscillates the pawls $e^{22}$ and $e^{38}$ through the described connections, and thus causes said pawls to impart step-by-step rotary feed movements to the blank-spindle and the cutter-spindle, these movements being timed to occur when the cutter is separated from the blank.

I do not limit myself to a mechanism for giving the work-spindle and cutter-spindle rotary step-by-step feed movements, as the said mechanism may be modified to continuously rotate said spindles at a slow rate without departing from the spirit of my invention, it being new with me to connect a cutter-spindle and a work-spindle with mechanism for simultaneously rotating both parts and maintaining an operative connection between them throughout a complete rotation of the work-spindle, whether the rotary movement be step by step or continuous.

*Means for compensating for the inclination of the cutter-spindle and for separating the cutter from the work during its return movement.*—As above stated, the cutter is given a suitable clearance by inclining its axis rotatively to the axis of the blank, the said relative inclination being such that the faces of the operating-teeth above the cutting-angles are in effect backed off or inclined backwardly from the cutting-angles. This result is accomplished by inclining the bearing $c^4$ and the guides $c^3$ $c^3$ so that the cutter-spindle $c'$ is supported at a slight inclination relatively to the work-spindle $b'$, as shown in Fig. 1, this inclination being constant, so that as each tooth is brought to its operative position it is backed off or inclined at a suitable angle for clearance. It is therefore necessary to give the slide $c^2$, the bearing $c^4$, and the guides $c^3$ $c^3$ a slight movement away from the blank while the spindle and cutter are descending and the cutter is acting on the blank to compensate for the inclination of the guides and the resulting endwise movement of the cutter-spindle in an inclined path, the result of the two movements—viz., the inclined endwise movement of the spindle and the compensating movement of its guides—being a movement of the cutter in a line parallel with the axis of the work-spindle.

The slide $c^2$ has a limited movement on the guides $c^3$ $c^3$ toward and from the work-spindle, and is pressed away or outwardly from the work-spindle by springs $ff$, Figs. 1 and 10, bearing on studs $f'$ $f'$, affixed to the slide $c^2$, and on a holding-slide $g$, which is adjustably secured to the frame of the machine for a purpose hereinafter described, although for the present said holding-slide will be considered as affixed to the frame.

$f^2$, Fig. 10, represents an elongated bearing-face formed on the secondary slide $c^7$, said face being vertical or parallel with the axis of the work-spindle instead of being inclined like the cutter-spindle and its guides. Between said bearing-face $f^2$ and the holding-slide $g$ is interposed a strut $f^3$, having a trundle-roll $f^4$ bearing on the vertical face $f^2$ and limiting the movement of the slide $c^2$ and the cutter-spindle away from the work-spindle. It will be seen that as the cutter-spindle and the secondary slide descend the bearing-face $f^2$ and strut $f^3$ permit the slide $c^2$ and the cutter-spindle to move outwardly, so that the actual movement of the cutter is in a line parallel with the said bearing-face.

To withdraw the cutter from the work during its return movement, I provide means for automatically shortening the strut $f^3$ at the close of the forward or cutting movement of the cutter, thus permitting the springs $f$ to move the cutter back from its operative path, and for lengthening the strut at the end of the return movement of the cutter, thus causing it to move the cutter back to its operative path, the cutter therefore moving forward in one path and returning in another. To this end I make the strut $f^3$ in two sections 5 6, one having a screw-thread and the other a tapped socket engaging said thread. The section 6 is rigidly secured to the holding-slide $g$ by a set-screw 7. To the section 5 is affixed a gear-segment 8, with which meshes a gear-segment 9, splined to the rock-shaft $e^{12}$ of the above-described feed mechanism. The feed-operating cam $e^5$ is timed to give the pawls $e^{22}$ $e^{38}$ their backward movement just as the cutter reaches the end of its forward movement, and in so doing rotates the shaft $e^{12}$ and gear-segment 9 in the direction indicated by the arrow in Fig. 7, thus causing the said gear-segment to partially rotate the section 5 of the strut in the direction required to shorten the strut by the coöperation of the screw-threads on the fixed and movable sections thereof. When the cutter reaches the end of its return movement, the feed-operating cam gives the pawls $e^{22}$ $e^{38}$ their forward movement, and in so doing rotates the shaft $e^{12}$ and gear-segment 9 in the direction required to lengthen the strut.

The described backward and forward movements of the cutter and its carrier (the slide $c^2$) require a sliding connection between the rock-shaft $e^{12}$, which is journaled in fixed bearings, and the gear-segment 9 and arm $e^{23}$, which are supported by and move with the slide $c^2$. I therefore provide said rock-shaft with a spline 12, Figs. 5 and 7, on which the segment 9 and arm $e^{33}$ are fitted to slide.

*Means for entering the cutter into the work in commencing the operation without feeding the cutter and work.*—At the commencement of the operation the cutter must be entirely outside of the periphery of the blank. I have therefore provided means whereby the feed mechanism may be made inoperative and means whereby the cutter may be advanced step by step until its central tooth has entered the blank to the full extent required before the operation of the feed mechanism.

The pawl $e^{22}$ is provided with a handle 13 and the pawl $e^{38}$ with a handle 14, whereby said pawls may be retracted from the accompanying ratchets, thus making the feed mechanism inoperative, the pawls being held retracted by pins 15 on said handles when the handles are turned to cause the said pins to bear on the outer ends of the levers carrying said pawls. The holding-slide $g$ has a nut $g'$, which is engaged by a feed-screw $g^2$, journaled in bearings on the supporting-frame. The feed-screw has a band-wheel $g^3$, by which it may be rotated to move the slide $g$. When the slide is thus moved inwardly toward the work-spindle, the strut $f^3$ forces the slide $c^2$ and the cutter $c$ inwardly at the same time. When the slide $g$ is moved outwardly, the springs $f$ and studs $f'$ cause the slide $c^2$ and the cutter to follow it. It will be seen, therefore, that the operator, after the completion of each piece of work, can withdraw the cutter from the work-spindle, so that it will be outside the periphery of the next blank, as shown in Fig. 12, and then by allowing the cutter to make its forward and return movements, as above described, and moving the slide $c^2$ forward after each return stroke the cutter can be advanced until its operative teeth have entered the work the required distance or until the central tooth has entered the blank to the maximum depth required, as shown in Fig. 14, after which the feed mechanism is made operative by releasing the pawls, the rest of the operation being automatic. It is obvious that automatic mechanism may be provided for advancing and withdrawing the cutter for the purpose above described.

The operation of generating gear-teeth on the blank by the combined feed motions of the cutter and blank is illustrated by Figs. 14 to 19, inclusive. Fig. 14 shows the form of the blank when the feed motions commence. In the succeeding figures the blank is shown by full and dotted lines in the position it occupies relatively to the cutter after the feed movements of the work and cutter and while the cutter is making its operative movement, the dotted lines indicating the metal being removed at the time. It will be understood, however, that in these views the quantity of metal removed is considerably exaggerated, the actual quantity removed by each pass of the cutter across the blank being too small to be represented in this manner.

Fig. 19 shows a completed tooth $t$, and Figs. 14, 15, 16, 17, and 18 show the successive steps involved in the generation or shaping of said tooth. These figures make the shaping or generating operation clear without further description. It will be seen that spur-gear teeth of any desired form may be produced in the manner and by the means described, the form of the teeth cut on the blank being determined by the form of the teeth of the cutter.

My invention is not limited to the formation of teeth on circular gears and may be used for shaping or generating rack-teeth. In Figs. 1, 2, 3, 4, and 8 I show a slide $s$, having a rectilinear movement in a fixed guide $s'$ and arranged to support a rack-blank and present it to the cutter $c$. Said slide may be moved progressively to feed the rack-blank by any suitable means, such as a gear, (not shown,) rotated step by step by a suitable modification of the mechanism which rotates the gear-blank $b$, the slide having rack-teeth $s^2$ to engage said gear. The operation of generating a series of rack-teeth is practically the same as that of generating gear-teeth, the only difference being a rectilinear instead of a rotary movement of the blank.

I do not limit myself to the details of mechanism here shown and may use any other suitable means for imparting to the gear-shaped cutter and the blank the necessary gear shaping or generating movements.

The chief advantages resulting from the employment of a gear-shaped cutter which is fed by a rotary movement on its own axis in a machine of the character described are as follows:

First. The cutter generates the form of the curve of each gear-tooth cut on the blank, so that each tooth cut is theoretically correct.

Secondly. One size of cutter for any given pitch will cut any size of gear.

Thirdly. The operation of cutting is continuous. In ordinary automatic gear-cutting machines there are two separate and distinct mechanisms, one for feeding the cutter and one for indexing the blank. Each mechanism must be inoperative while the other is in operation, a complication of mechanism being involved which is avoided by my improvement.

Fourthly. Several cutting teeth or points are in operative contact with the work simultaneously, insuring a rapid operation.

Fifthly. The same cutter will cut either external or internal gear-teeth with equal ease and correctness. This is an important advantage, it being very difficult to cut internal gears correctly by any of the gear-cutting machines now in use.

I do not limit myself to a cutter of conventional gear shape. A cutter of any form having a circular series of cutting teeth or projections alternating with recesses, the highest or outer portions of the teeth being substantially equidistant from the axis of rotation of the cutter, will be within the scope of my invention.

In Fig. 20 I show a cutter $c^3$ formed to cut a sprocket-wheel, the teeth being longer than the intervening recesses.

In Fig. 21 I show a cutter $c'$ having curved teeth or projections shaped to form four plane surfaces $c^2$ on a blank presented to it, both the blank and the cutter having a rotary feed movement, the cutter having also a back-and-forth movement across the blank.

Having thus explained the nature of my invention and described a way of constructing and using the same, though without attempting to set forth all of the forms in which it may be made or all of the modes of its use, I declare that what I claim is—

1. The combination of a metal-planing cutter having a circular series of radiating or outwardly-projecting gear-shaped metal-planing teeth, a blank holder or support, means for reciprocating one of said parts to cause the cutter to plane the blank, and means for changing the relative positions of said parts to cause the said teeth to act successively at different points on the blank and generate the curves of gear-teeth thereon.

2. The combination of a gear-shaped metal-planing cutter, a blank holder or support and means for rotating it, means for reciprocating one of said parts, means for holding the cutter at an inclination relatively to the gear-receiving face of the blank to give the operating-teeth of said cutter the clearance of metal-planing tools, and means for rotating the cutter.

3. The combination of a gear-shaped metal-planing cutter having external gear-shaped teeth arranged in a circular series, a blank-holder, cutter-operating mechanism having provisions for progressively rotating said cutter to make its teeth successively operative and for reciprocating the cutter to give the operative teeth their cutting and return movements, and mechanism for feeding the blank.

4. The combination of a blank-holder, a gear-shaped metal-planing cutter, a spindle supporting said cutter, bearings supporting said spindle, means for rotating the spindle in said bearings to feed the cutter, means for reciprocating the spindle and its bearings to give the cutter its operative movements across the blank, and mechanism for feeding the blank.

5. The combination of a blank-holder, a gear-shaped metal-planing cutter, a spindle supporting said cutter, bearings supporting said spindle at an inclination relatively to the gear-receiving face of the blank to give clearance to the teeth of the cutter, means for reciprocating the spindle and its bearings, and means for giving said bearings a lateral movement during the forward movement of the cutter to compensate for the inclination of the spindle and cutter.

6. The combination of a blank-holder, a gear-shaped metal-planing cutter, a spindle supporting said cutter, bearings supporting said spindle, means for reciprocating the spindle and its bearings to carry the cutter forward and back across the blank, means for changing the path of the spindle relatively to the blank-holder after each stroke of the cutter to alternately project and retract the cutter, and means for rotating the cutter.

7. The combination of a blank-holder, a gear-shaped metal-planing cutter, a spindle supporting said cutter, bearings supporting said spindle, means for reciprocating the spindle and its bearings to carry the cutter forward and back across the blank, means for changing the path of the spindle relatively to the blank-holder after each stroke of the cutter to alternately project and retract the cutter, means for imparting a progressive lateral movement to the spindle and its bearings, to advance it into the blank, and means for rotating the cutter, the said last-named means having provision for being made temporarily inoperative.

8. The combination of a gear-shaped metal-planing cutter, a spindle supporting the same, a blank-holder, a driving-shaft, mechanism for imparting a rotary motion from the said shaft to the cutter-spindle, and mechanism for imparting a reciprocating motion to the spindle, the last-mentioned mechanism having provision for varying the speed of the reciprocating movement after each stroke.

9. The combination of a gear-shaped metal-planing cutter, a spindle supporting the same, a blank-holding spindle, a driving-shaft, connections intermediate the said shaft and spindles for positively rotating the spindles in unison, and connections intermediate the driving-shaft and cutter-spindle for imparting a reciprocating motion to the latter.

10. The combination of a gear-shaped metal-planing cutter, a spindle supporting the same, a blank-holding spindle, a rock-shaft $e^{12}$ intermediate the driving-shaft and spindles, connections between the rock-shaft and driving-shaft whereby the rock-shaft is positively oscillated, and connections between the rock-shaft and spindles for imparting positive rotary movements to the spindles in unison, and connections between the driving-shaft and cutter-spindle for reciprocating the latter.

11. The combination of a blank-holder, a gear-shaped metal-planing cutter, a spindle supporting the cutter, a primary slide supporting the spindle, and movable to reciprocate the spindle longitudinally, a secondary slide supporting the primary slide, and movable toward and from the blank-holder, mechanism for reciprocating the primary slide and spindle, an adjustable connection between the said slides and mechanism for adjusting said connection to vary the position of the primary slide.

12. The combination of a blank-holder, a metal-planing cutter, a spindle supporting the cutter, a slide having bearings for the spindle, means for reciprocating the slide and spindle, a sleeve $e^2$ which rotates with the cutter but does not reciprocate with it, and a counterbalancing-spring seated on said sleeve and exerting an upward pressure on the slide and spindle.

13. The combination of a gear-shaped metal-planing cutter, a rotary spindle supporting the cutter, a rotary blank-holding spindle, gearing adapted to impart rotary motion to said spindles, pawls and ratchets adapted to operate said gearing, and means for simultaneously oscillating said pawls.

14. The combination of a gear-shaped metal-planing cutter, a rotary spindle supporting the cutter, a rotary blank-holding spindle, and a swinging bearing for the last-named spindle, adapted to displace the spindle from its operative position.

In testimony whereof I have signed my name to this specification, in the presence of two subscribing witnesses, this 24th day of March, A. D. 1896.

EDWIN R. FELLOWS.

Witnesses:
M. L. LAWRENCE,
ALICE M. WHEELER.